Patented Sept. 15, 1936

2,054,131

UNITED STATES PATENT OFFICE 2,054,131

FIBROUS FILLING MATERIALS FOR STUFFING PURPOSES

Leo Kollek, Ludwigshafen-on-the-Rhine, Germany, assignor to I. G. Farbenindustrie Aktiengesellschaft, Frankfort-on-the-Main, Germany No Drawing. Application February 10, 1934, Serial No. 710,751. In Germany February 18, 1933

3 Claims. (Cl. 91—68)

The present invention relates to fibrous materials for stuffing purposes and a process of producing same.

The filling materials of animal or vegetable origin hitherto used for stuffing purposes, such as horse-hair, cow-hair, pig-hair, goose-feathers, coco-fibres, kapok, Algerian grass and the like, have the disadvantage that by continued use of the stuffings the loose layers, particularly the upper layers, of the filling materials are displaced from the more intensely used parts towards the less intensely used parts. Cavities free from filling materials are thus formed, which cause undesired alterations of the shape and elasticity of the stuffings.

I have now found that very valuable filling materials for stuffing purposes, which do not possess the said disadvantage, may be obtained by impregnating fibrous filling materials with polymerization products of aliphatic vinyl compounds in finely divided form. The desired fine division of the polymerization products is attained by dissolving them in organic solvents, such as acetone, benzene or the like, or by dispersing them in media, in which they are insoluble, such as water etc. Suitable polymerization products are, for example, polyacrylic acid methyl or ethyl ester, polyacrylic nitrile, polyvinyl esters, such as polyvinyl acetate, polyvinyl methyl ether or polyvinyl ethyl ether, and the like. Uniform polymerization products, or mixtures of polymerization products, or interpolymerization products, i. e. products obtained by polymerization of mixtures of polymerizable compounds, may be used. The polymerization products of aliphatic vinyl compounds may be used, for example, together with polymerized styrene. Interpolymerization products of aliphatic vinyl compounds and styrene may also be employed. Styrene may be used in such combinations in amounts of up to 90 per cent, preferably up to 50 per cent. The solutions of the said polymerization products are produced in the usual manner by the use of the most suitable solvents, for example, hydrocarbons, alcohols, esters, ethers or ketones. The dispersions are preferably prepared by first dissolving the polymerization products, mixtures of polymerization products or interpolymerization products in organic solvents and dispersing the solutions thus obtained in aqueous media. Dispersions may also be used, which are obtained by dispersing monomeric vinyl compounds in water and subjecting the dispersions thus obtained to polymerization, as described in application Ser. No. 509,532, filed January 17, 1931.

The filling materials consisting of animal or vegetable fibres are treated in the loose or shaped state with the solutions or dispersions of the polymerization products by dipping or spraying. The excess of the impregnating solutions is removed, for example, by pressing or squeezing. Finally the materials are dried. Products are thus obtained which possess an improved elasticity, and ability to resist mechanical treatment and maintain their original shape.

The impregnation may be effected under ordinary or elevated pressure. Usually it is carried out at ordinary temperature. However, elevated temperatures which, of course, are limited by the boiling point of the solvents or media in which dispersion is effected, may also be employed. Temperatures at which decomposition of the materials under treatment would occur, are avoided.

The solutions and dispersions of the polymerization products of the vinyl compounds may be used with additions of natural or artificial resins, derivatives of cellulose, such as nitro-cellulose, softening agents, solutions of rubber and the like. By these additions the process may be varied in any desired manner according to the nature of the fibrous material and to the use intended. By adding dyestuffs to the solutions or dispersions the fibrous materials may simultaneously be dyed.

The following examples will further illustrate the nature of this invention, but the invention is not restricted to these examples. The parts are by weight.

*Example 1*

Loose horse-hairs are dipped into a 10 per cent aqueous dispersion of polyacrylic acid methyl ester (obtainable, for example, according to application Ser. No. 509,532). The excess of impregnating agent is removed by pressing the hairs. By drying the latter a very elastic stuffing material is obtained.

*Example 2*

Horse-hairs are treated with a 10 per cent solution of polyacrylic acid ethyl ester in benzene in a manner analogous to that described in Example 1. The product obtained is a stuffing material of good filling properties and high elasticity.

*Example 3*

Frizzled hairs are impregnated with a 10 per cent aqueous dispersion of polyvinyl acetate (prepared, for example, according to the process described in application Ser. No. 509,532). A material is obtained which is very elastic and keeps this property even after very long use of stuffings produced therewith.

Instead of polyvinyl acetate a product obtained by interpolymerization of equimolecular amounts of vinyl chloride and acrylic acid butyl ester may be applied in an analogous manner.

Example 4

Sea-grass is impregnated with a 7.5 per cent acetonic solution of an interpolymerization product obtained by polymerizing a mixture of 10 parts by weight of acrylic nitrile and 90 parts of acrylic acid ethyl ester according to application Ser. No. 509,532. The material thus treated possesses a lasting elasticity.

Example 5

Frizzled hairs are impregnated with a 10 per cent solution of polyvinyl chloracetate in acetic ester containing from 0.5 to 1 per cent of dibutyl phthalate. A filling material for stuffing purposes of good properties is obtained.

Example 6

Cow-hairs are impregnated with an about 10 per cent solution in benzene of a product obtainable by interpolymerizing 70 per cent of styrene and 30 per cent of acrylic acid butylester. A very valuable filling material for stuffing purposes is obtained.

Example 7

Horse-hairs or cow-hairs or frizzled hairs are impregnated with a solution of 12 parts of acrylic acid methyl ester and 6 parts of a nitrocellulose which is capable of yielding solutions of low viscosity in 40 parts of acetic acid ethyl ester, 20 parts of butyl acetate, 5 parts of butanol, 10 parts of ethyl alcohol and 25 parts of toluene. A good filling material for stuffing purposes is obtained.

What I claim is:—

1. Highly elastic upholstery stuffings comprising fibrous materials selected from the class consisting of horse-hair, cow-hair, pig-hair, frizzled hairs, goose feathers, coco-fibres, kapok, Algerian grass and sea-grass which have been impregnated with a polymerization product comprising a polymerized aliphatic vinyl compound.

2. Highly elastic upholstery stuffings comprising fibrous materials selected from the class consisting of horse-hair, cow-hair, pig-hair, frizzled hairs, goose feathers, coco-fibres, kapok, Algerian grass and sea-grass which have been impregnated with an interpolymerization product comprising a polymerized aliphatic vinyl compound.

3. Highly elastic upholstery stuffings comprising fibrous materials selected from the class consisting of horse-hair, cow-hair, pig-hair, frizzled hairs, goose feathers, coco-fibres, kapok, Algerian grass and sea-grass which have been impregnated with a polyacrylic acid ester.

LEO KOLLEK.